April 18, 1961     E. R. ROSEN     2,979,984
SHUTTER FOR PINHOLE DETECTORS

Filed Sept. 6, 1957     2 Sheets-Sheet 1

INVENTOR:
EDGAR R. ROSEN,
BY *Melvin M. Goldenberg*
HIS ATTORNEY.

April 18, 1961  E. R. ROSEN  2,979,984
SHUTTER FOR PINHOLE DETECTORS
Filed Sept. 6, 1957  2 Sheets-Sheet 2

INVENTOR:
EDGAR R. ROSEN,
BY *Melvin M. Goldenberg*
HIS ATTORNEY.

United States Patent Office 2,979,984
Patented Apr. 18, 1961

2,979,984
SHUTTER FOR PINHOLE DETECTORS
Edgar R. Rosen, Waynesboro, Va., assignor to General Electric Company, a corporation of New York
Filed Sept. 6, 1957, Ser. No. 682,418
2 Claims. (Cl. 88—14)

This invention relates to improvements in devices for the inspection of web material. More specifically, it relates to a novel means for maintaining such material in a proper position in order that the inspection thereof may be effected.

In order to inspect web material such as steel strip to determine the presence of pin holes, photoelectric devices are mounted in a suitable chamber and a light source is provided on the other side of the material so that in the presence of a pin hole in the material the photoelectric device will provide an output to operate a device such as an alarm, a suitable marker or means to eject the material from the production line of which the inspection device is a part. Such equipment is provided with a shutter device to prevent the entry of extraneous light into the chamber. Inasmuch as such material is produced in large quantities, it is desirable to conduct the inspection rapidly. Since the shutter device bears against the material, it is important that it also functions to maintain the material in a proper position to effect the inspection.

Therefore, it is an object of this invention to provide a novel shutter for a photoelectric inspection device which is capable of preventing the entry of extraneous light and maintaining the material being inspected by the device in a proper inspecting position even though the material is moving rapidly.

Since such material is ordinarily rather thin, it is undesirable to provide a shutter positioning means which exerts excessive pressure thereon due to the tendency of such thin material to buckle and decrease the efficiency of the inspecting device.

It is, therefore, another object of this invention to provide a novel means providing shutters for maintaining web or sheet material in a proper inspecting position in such a manner that there will be substantially no tendency on the part of the material to buckle due to the action of the shutter and positioning means.

Briefly, in one embodiment of the invention there is provided a pair of shutter devices on the inspection device, one on each side of the material being inspected. A reciprocating fluid motor is provided to position each shutter device against the material being inspected and which motors are constructed in such a manner so that a correct amount of positioning force urging them toward the material is normally supplied. Also included is a means whereby the shutter devices may be quickly withdrawn from the sides of the material in the event that the operator determines that such action is necessary.

The subject matter which I regard as my invention is particularly pointed out and distinctly claimed in the concluding portion of this specification. My invention, however, both as to its structure and method of operation together with further objects and advantages thereof may best be understood by reference to the following description taken in connection with the accompanying drawing in which:

Figure 1:
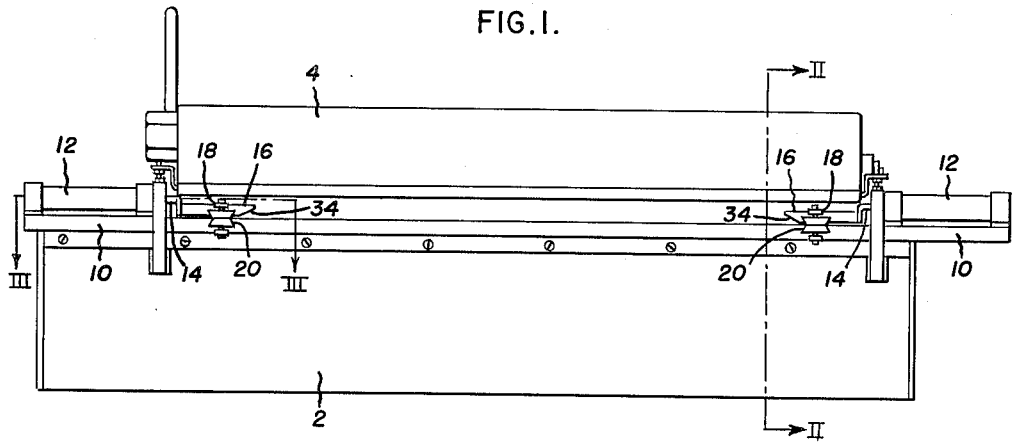
Fig. 1 is a side view of a photoelectric inspection device incorporating my invention.

Referring to Fig. 1 of the drawing, there may be seen a photoelectric inspection device such as would be used for the inspection of material such as sheet or strip steel which, as viewed in Fig. 1, would move into or out of the plane of the paper. The device is constituted by a chamber 2 comprising a box-like structure in which photoelectric devices are mounted to respond to light from a source housed in a housing 4 and passing through any holes in the material. The housing 4 may be mounted on the chamber 2 by a bracket 6 provided with hinges 8 in order that it may be rotated to an out-of-the-way position for inspection and maintenance purposes.

In accordance with my invention, I provide a support 10 secured to the chamber 2 and which may extend laterally therefrom. Mounted on each side of the support 2 and therefore on each side of the material being inspected is a reciprocating fluid motor including a cylinder such as shown at 12. A ram or piston rod 14 extends from the cylinder 12 and is actuated by the pressure of the fluid supplied thereto. The piston rod 14 is secured to a shutter 16 which is mounted on the chamber 2 in order that it may reciprocate thereon. Carried by the shutter 16 is a bracket 18 supporting guide rollers 20 for the purpose of positioning the material being inspected.

Figure 2:
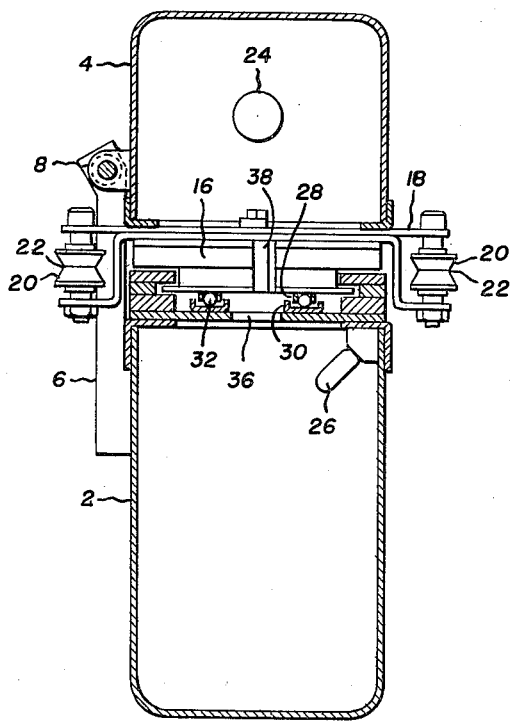
Fig. 2 is a sectional view along the line II—II in Fig. 1.

As viewed in Fig. 2, material being inspected would move from right to left or from left to right. As may be seen in Fig. 2, the bracket 18 is provided with a portion extending downwardly so that a support for the rotatable guide roller is provided. Each guide roller is in the form of a pair of tapered truncated cones meeting at a center line 22 which is co-planar with the surface over which the material being inspected passes.

As may also be seen in Fig. 2, the light source in the housing 4 is shown at 24 and the chamber 2 is shown as a hollow chamber having a plurality of photoelectric cells, one of which 26 is illustrated in a typical position. Friction between the lowest surface of the shutter 16 and the upper surface of the chamber 2 may be minimized by a ball bearing means comprising a ball bearing separator 28 and a lower U-shaped guide 30 mounted on the upper surface of the chamber 2. A plurality of ball bearings 32 are provided between these two guides.

Figure 3:
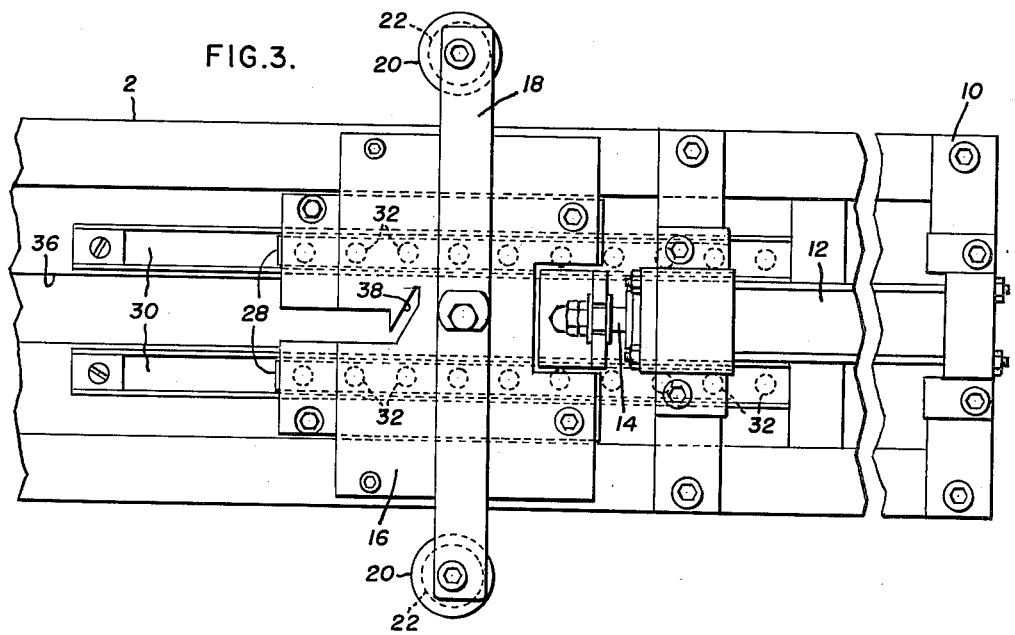
Fig. 3 is a sectional view along the line III—III in Fig. 1.

As may be seen in Fig. 1, the shutter 16 is provided with a portion 34 which will overlie the edge of the material being inspected. The material being inspected will pass over an opening 36 on the upper side of the chamber 2, which opening will be of a length equal or greater than the width of the material. In Fig. 3, the shutter 16 is shown to be of such a size as to extend beyond each side of the opening and over each end thereof in order to prevent light from extraneous sources from entering the chamber. In order that a complete inspection of the edge of the material may be effected, a shaped notch 38 is provided in the edge of the shutter overlying the opening 36. When the shutter is painted or made of a non-reflecting material, the effect of the shaped notch 38 is to prevent light from penetrating through to the end of the notch from sources other than vertical rays, primarily from the source 24. This permits inspection of substantially the full width of the material by minimizing light leakage around the edge.

Figure 4:
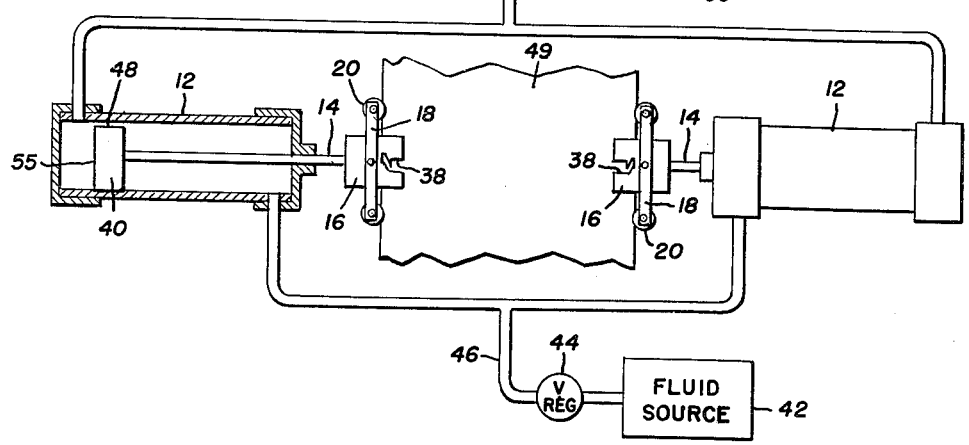
Fig. 4 is a schematic illustration of a fluid circuit incorporating my invention.

In order to maintain the shutters 16 in a position wherein they bear against the edge of the material being inspected in order to seal out extraneous light and yet at the same time prevent any buckling of the material, the cylinders 12 are provided with pistons 40 movable therein. As may be seen in Fig. 4, parts of which are shown on an exaggerated scale, the relative size of the pistons 40 and interior of the cylinders 12 may be made such that passage of fluid from one side of the piston to the other may be had. In this arrangement, fluid is supplied from a source 42 through a pressure regulating valve 44, which maintains the fluid at a constant pressure, through the conduit 46 to the cylinder on the piston rod side of the piston 40. The fluid will leak through the clearance provided as shown at 48 to the other side of the piston. Since the fluid pressure is the same on both sides of the pistons, the force exerted on the side 55 away from the piston rod 14 will be greater than that exerted on the piston rod side due to the fact that there is less area on the piston rod side. The pistons and piston rods will, therefore, tend to move toward each other forcing the shutters 16 into engagement with the material 49. By proper regulation of the valve 44, this force can be determined to be sufficient to maintain the contact and yet not such as to cause a buckling of the material. When it is desirable as determined by the operator to retract the shutters 16 from the material 49, a valve 50 in a conduit 52 from the closed ends of the cylinders 12 may be opened either manually as by the handle 54, or by an electrically operated means to quickly reduce the pressure on the sides 55 of the piston 40 so that the pistons 40 and rod 14 are retracted into the cylinders 12.

Although in accordance with the provisions of the patent statutes the principle of this invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In a photoelectric device for inspecting sheet material, the combination of a light source, a chamber having an elongated opening provided therein and containing light responsive means spaced therefrom, shutters movably supported at each end of the chamber and having portions overlying said opening therein, said shutters being provided with respective notches located in interior edges thereof and shaped to permit substantially only vertically impinging light energy to pass therethrough, a set of guide rollers carried by each of said shutters, said guide rollers being positioned relative to their respective shutters to maintain the outer edges of said material slightly exterior of and beyond the most exterior portion of said notches whereby light from said source impinges on substantially all of said material, and means for urging said sets of rollers toward each other and against said material being inspected with a predetermined force comprising a fluid motor including a cylinder, a reciprocating piston in said cylinder having a diameter less than the interior diameter of said cylinder for providing a passage for fluid from one side of said piston to the other side thereof, conduit means at one end of said cylinder for connection to a fluid source, and valve means connected to other end of said cylinder for exhausting the fluid therefrom.

2. The device defined in claim 1 wherein each of said notches is bounded at the interior portion by first edges which are substantially parallel to said elongated opening and each of said notches is bounded at the exterior portion by edges which form an angle with said first edges.

References Cited in the file of this patent
UNITED STATES PATENTS

| | | |
|---|---|---|
| 1,480,937 | Gottschalk | Jan. 15, 1924 |
| 2,484,347 | Iversen | Oct. 11, 1949 |
| 2,623,501 | Audemar | Dec. 30, 1952 |
| 2,739,503 | Nieman et al. | Mar. 27, 1956 |
| 2,877,013 | Wendshuh et al. | Mar. 10, 1959 |